United States Patent [19]

Parquet

[11] 4,278,011

[45] Jul. 14, 1981

[54] AUTOMATIC HYDRAULIC SHUT-OFF SYSTEM

[75] Inventor: Donald J. Parquet, Burlington, Iowa

[73] Assignee: J. I. Case Company, Racine, Wis.

[21] Appl. No.: 943,564

[22] Filed: Sep. 18, 1978

Related U.S. Application Data

[62] Division of Ser. No. 803,686, Jun. 6, 1977, abandoned.

[51] Int. Cl.[3] .................... F15B 13/044; F16K 17/22

[52] U.S. Cl. .................................... 91/445; 137/460; 137/498

[58] Field of Search ................. 91/445, 433; 137/460, 137/498

[56] References Cited

U.S. PATENT DOCUMENTS

| | | | |
|---|---|---|---|
| 2,012,351 | 8/1935 | Riney et al. | 137/460 X |
| 2,964,016 | 12/1960 | Talak | 91/420 |
| 3,127,688 | 4/1964 | Hein et al. | 91/445 X |
| 3,434,493 | 3/1969 | Owens | 137/460 |
| 3,878,765 | 4/1975 | Walters et al. | 91/433 |
| 4,004,607 | 1/1977 | Freese | 137/486 |
| 4,063,489 | 12/1977 | Parquet et al. | 91/445 |

*Primary Examiner*—Irwin C. Cohen

*Attorney, Agent, or Firm*—Arthur J. Hansmann

[57] ABSTRACT

An automatic hydraulic shut-off system for use with a hydraulic valve and a work apparatus which is retained under hydraulic pressure even when the hydraulic line is broken inadvertently. A lock valve is connected in the line and senses the loss of hydraulic pressure, and the valve is actuated in response to the pressure drop and retains the work apparatus in a pressurized condition to thereby avoid undesired movement in response to the loss of pressure.

1 Claim, 5 Drawing Figures

AUTOMATIC HYDRAULIC SHUT-OFF SYSTEM

This is a division of U.S. patent application Ser. No. 803,686, filed June 6, 1977, and now abandoned.

This invention relates to a hydraulic shut-off system of the type utilized in apparatus which incorporates a hydraulic valve and a working hydraulic motor or piston arrangement, all arranged with a safety mechanism useful in the event the hydraulic line is broken or the hydraulic pressure is reduced inadvertently.

BACKGROUND OF THE INVENTION

The prior art is already aware of safety mechanisms, such as safety controls, for use in hydraulic equipment wherein the hydraulic line is broken or the hydraulic pump is turned off. One such example of a control is shown in U.S. Pat. No. 2,964,016, and that patent is showing apparatus useful in retaining a lifted load in an elevated position even though the hydraulic pressure is inadvertently reduced. The present invention is an improvement upon this type of apparatus, and it accomplishes the arrangement of a hydraulic safety system which is self-actuating and is reliable and operative in the event that the hydraulic pressure is inadvertently reduced, and the lifted load or the like will not be immediately released in response to the reduced hydraulic pressure.

Another object of this invention is to provide a hydraulic safety system which is simplified in its apparatus and in its installation, and to provide one which can be readily and easily installed in a hydraulic system and is constantly available and is reusable for locking the system in an operative position when the hydraulic pressure is inadvertently reduced, such as by having a hydraulic line break. As such, the present invention provides a fail-safe system, for the purpposes mentioned above.

Still further, the present invention provides a hydraulic safety system which is automatically operative, under the conditions and for the reasons mentioned above, and one which can also be manually operated to release it from a locked position wherein the work load is being supported even though the hydraulic line or the line has failed to retain hydraulic pressure. In accomplishing this object, the manual release is arranged so that it can be operated to gradually release the hydraulic pressurizing and sustaining of the lifted load, for instance, and thus the safety lock or like element of this invention provides for automatic safety and also for controlled manual release of same.

Other objects and advantages will become apparent upon reading the following description in light of the accompanying drawings.

DETAILED DESCRIPTION OF THE PREFERRED EMBODIMENT

Figure 1:
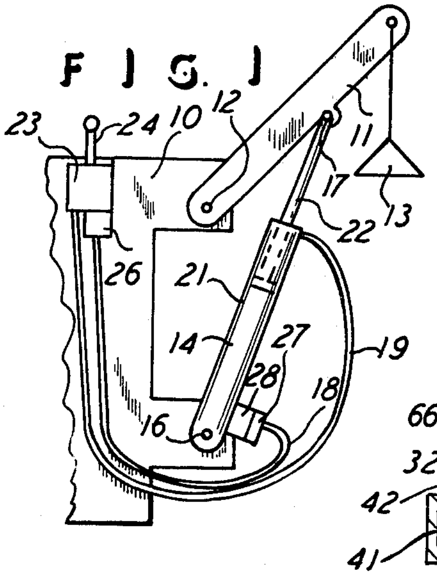
FIG. 1 is a side elevational view of hoisting apparatus with the elements of this invention.

FIG. 1 shows an arrangement of hoisting apparatus, and this may be in the nature of a conventional type of backhoe equipment mounted on a tractor 10 and having lift arm 11 pivotal thereon about a shaft 12. The load is designated 13 and is of course lifted by the pivotal movement of the arm 11, and a cylinder assembly 14 is pivotally mounted on the tractor 10 at a shaft 16 and is pivotally connected to the arm 11 at a shaft 17. Thus extension and contraction of the cylinder assembly 14 will of course raise and lower the arm 11 and thereby raise and lower the load 13 which may actually be a backhoe bucket or a like load which one skilled in the art will readily comprehend according to the disclosure herein and the showing in FIG. 1.

FIG. 1 further shows that the arm 11 is under the influence of the fluid cylinder assembly 14, and this is preferably a hydraulic system and will therefore be described as such. Hydraulic lines or hoses 18 and 19 connect into opposite ends of the cylinder 21 of the assembly 14, and thus the cylinder rod 22 will extend and contract relative to the cylinder 21, according to fluid pressures introduced into the cylinder 21 and through the hoses 18 and 19. A control valve 23 operated through a handle 24 is mounted on the tractor or support 10 and the hoses 18 and 19 connect with the valve 23. A fluid pressure sensor 26 is in fluid-flow communication with the valve 23 and the hose 18, and another fluid pressure sensor 27 and a fluid valve 28 are in fluid-flow communication between the hose 18 and one end of the cylinder 21.

With the arrangement shown in FIG. 1, it will be seen and understood that the valve 28 is mounted and located adjacent the cylinder 21 and at the head end of the cylinder 21 such that if there is a break in the hydraulic line 18, then closing of the fluid valve 28 will prevent the cylinder assembly 14 from contracting and thereby permitting the load 13 to fall. With this desirable consequence, the load 13 will be held in its elevated position even though there is a break in the hydraulic hose 18 or any place else in the hydraulic system beyond the valve 28 as it relates to the cylinder 21.

Figure 2:
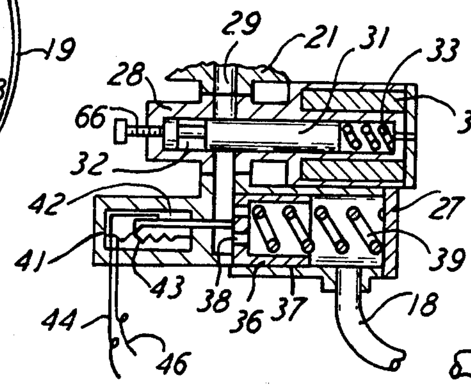
FIGS. 2 and 3 are sectional views of the valves, on an enlarged scale, shown in FIG. 1.

FIG. 2 shows the fragment of the cylinder 21, and the valve 28 is suitably mounted thereon such that a fluid passageway 29 extends between the cylinder 21 and the valve 28, and a spool-type of valve closure 31 is disposed within the valve 28 and has a fluid passageway 32 which can align with the passageway 29, such as upon shifting of the spool 31 to the right and against the spring 33, as viewed in FIG. 2. Of course in the leftward shifted position shown in FIG. 2, the valve 28 is shut off and is therefore retaining the fluid pressure in the cylinder 14 and is thereby preventing the load 13 from falling, as desired. Also incorporated with or connected to the hydraulic valve 28 are a conventional electric solenoid 34 and a hydraulic responsive flow controlled and electric variable resistance apparatus 37. Thus, in a conventional arrangement of providing a solenoid type of valve, the usual and conventional solenoid 34 is provided for inducing axial movement of the spool 31, according to the electric energy in the solenoid 34 to thereby open and close the hydraulic spool 31 and permit flow through the passageways 29 which are actually in flow communication with the hose 18 through the apparatus 37. Thus the apparatus 37 is shown to include a slidable piston 36 which has orifices 38 therein and which is biased by a spring 39. An electric potentiometer 41 is included in the apparatus 37 and has one electric member 42 movable with the piston 36 and has the other electric side 43 affixed in the apparatus 36, in a conventional arrangement. Electric wires 44 and 46 respectively connect with the potentiometer sides 42 and 43 and extend therefrom, as shown.

With the arrangement shown in FIG. 2, when there is backflow from the passages 29 and toward the hose 18, such as when the hose 18 breaks and the flow is of a considerable and instantaneous form, then the piston 36 will slide to the right in response to the flow in that direction and this will change the setting on the potentiometer, and, according to the then instant condition of the sensor 26 as shown and described in connection with FIG. 3, the valve spool 31 may move to its closed position shown, as hereinafter described.

Figure 3:
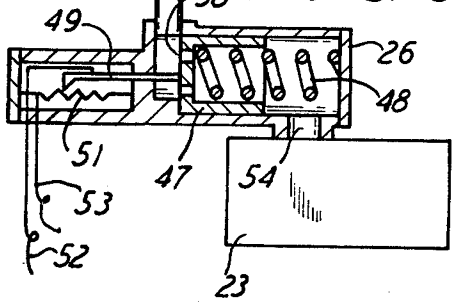

FIG. 3 shows the sensor 26 and it has a piston 47 slidable therein against the influence of a spring 48, and it also has a potentiometer in the form of one electric element 49 and the fixed electric element 51 and the respective connecting wires 52 and 53, and of course the element 49 is connected with the piston 47 to move therewith and thus change the electric condition in the potentiometer described. FIG. 3 also shows that the sensor 26 is in flow communication, through the passageway 54, with the valve 23.

Figure 4:
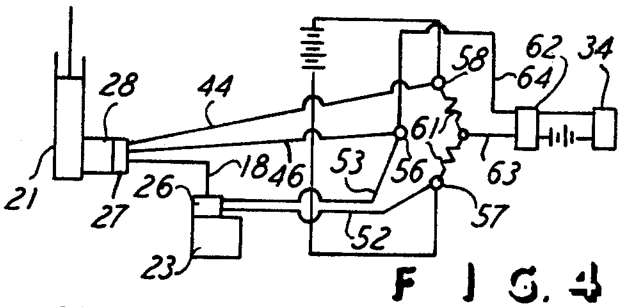
FIG. 4 is a diagrammatic view of the valves and the electric circuit connected therewith.

Thus, with the aforementioned description, it will be understood that if there is a break in the hose 18, then the movement of the piston 36 would be greater than the movement of the piston 47, and the differential in the movement would be registered on the respective electrical elements in each sensor 26 and 27. That difference in the electric apparatus of each of the sensors can be detected and can thereby be impressed upon the solenoid 34 for closing the spool 31 and thereby avoid having the load 13 fall to the ground. FIG. 4 shows the electric schematic arrangement, and it will here be seen that the valve 23 and the sensors 26 and 27 are connected through the hose 18 and are connected with the cylinder assembly 21. Also, the sensors 26 and 27 are electrically connected into a bridge and are connected to a common connector 56 and to opposite sides 57 and 58 of resistors 61. Also, a latching electric relay 62, of a conventional and well-known design, is connected to the bridge through electric lines 63 and 64, and the latching relay is then schematically shown to be connected to the controls for the solenoid valve 28, and that is simply diagrammatically shown in FIG. 4, and one skilled in the art will understand the disclosure and the arrangement and connection such that there is the electric latching relay 62 operative on the solenoid 34 for controlling the valve 28. Such control is of course in accordance with the electrical difference between the sensors 26 and 27, as established by the difference in the then back flow through the respective sensors 26 and 27.

Accordingly, it is well known that for a given flow of fluid through a fixed orifice, there will be a certain specific and repeatable pressure drop which will be constant as long as the flow and temperature remain constant. Where there are two identical orifices in series, such as provided in the orifices 38 in the respective pistons 36 and 47, each orifice will produce the same pressure drop and the temperature-viscosity relationship will be eliminated. It also follows that the movement of the pistons 36 and 47 will be identical under those aforementioned condition. Accordingly, where a linear potentiometer is connected to the respective pistons 36 and 47, as shown in FIGS. 2 and 3, there will be the same electrical resistance for the same flow conditions, and if these electric resistances are compared for balance in a wheatstone-bridge type of device shown in FIG. 4 then, any difference in the electric resistances will actuate the latching relay 62 and actuate the sensor 27 and thereby close the solenoid valve 28.

A manually-controllable screw 66 is included in the valve 28 and can abut the end of the spool 31 to manually open the valve 28 and thereby permit lowering of the load 13 under manual control, if and when desired. Also, the solenoid 34 can be normally closed, and thus there is also an electric fail-safe arrangement such that if the electric power fails, then the spool 31 will go to the closed position.

Figure 5:
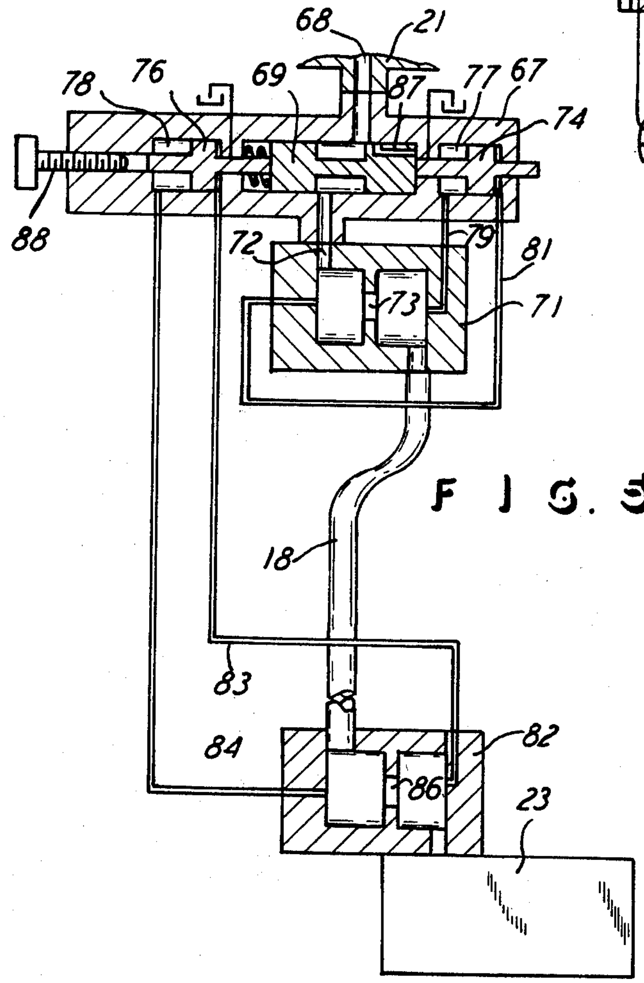
FIG. 5 is a sectional view of the valves useful in FIG. 1 and showing hydraulic, rather than electric, controls.

FIG. 5 shows another embodiment, and this is an all hydraulic arrangement and here the cylinder 21 has a hydraulic valve 67 mounted thereon and they have a passageway 68 extending therethrough and to the valve spool 69 shown. In this embodiment, a hydraulic sensor 71 is fluid connected through a passageway 72 with the valve 67, and it presents an orifice 73 for flow through the sensor 71. The valve 67 also has two pistons 74 and 76 slidable in chambers 77 and 78, respectively, in the valve 67. Sensor fluid lines 79 and 81 connect between opposite sides of the sensor 71 and opposite ends of the piston chamber 77; and another sensor 82 has fluid sensor lines 83 and 84 connected between opposite sides of the orifice 86 in the sensor 82 and to opposite sides of the valve chamber 78, as shown. Also, the hydraulic hose 18 is shown connected between the sensors 71 and 82, and this would be in the arrangement shown in FIG. 1. Also, the selector or control valve 23 is shown connected with the sensor 82.

Accordingly, with the flow conditions through the orifices 73 and 86 being regular, the load pistons 74 and 76 will remain in positions which will have the spool 69 remain open so that flow can go between the passageways 68 and 72 in the normal operation of the apparatus. However, if the flow conditions through the orifices 73 and 86 become unbalanced to a sufficient degree, such as caused by a break in the hose 18, then the differential forces on the load pistons 74 and 76 will cause a shifting of the spool 69 and thereby close the flow between the passageways 68 and 72 and again prevent the falling of the load 13, all as desired. The actual shifting of the spool 69 can be assisted or even effected by a fluid passageway 87 extending through the spool 69 and arranged to be in fluid-flow connection with the passageway 68 and the right-hand end of the spool 69, when the spool 69 is shifted slightly to the left, and thus the upstream or higher pressure in the passageway 68 will cause the spool 69 to firmly shift to the left and that is to its closed position, as desired. Again a manual release screw 88 is provided in the valve 67 to shift the spool 69 to the right when and if such action is desired.

I claim:

1. A hydraulic safety system comprising a valve housing having fluid passageway therein and a valve spool closure movably disposed therein for opening and closing said passageway, a hydraulic valve unit, a hydraulic responsive apparatus for applying a mechanical force in response to hydraulic pressure applied to said apparatus, hydraulic lines connected between said valve housing and said valve unit and said apparatus, a hydraulic flow sensor fluid-flow connected with each of said valve housing and said valve unit for detecting fluid flow between said valve housing and said valve unit, said sensors each including a movable piston exposed to fluid flow and movable in response thereto, an electrical wheatstone bridge circuit, said sensors each including electrical potentiometer elements consisting of an electrical contact connected with and movable with each said piston and an electrical wiring of said bridge circuit on which said contact is in sliding contact and with said electrical elements arranged to produce an electric resistance in accordance with the flow of fluid through said sensors, and a solenoid unit electrically connected with said electrical elements and operatively associated with said valve spool closure for positioning said valve spool closure in accordance with the differences in the electrical resistance produced by said elements.

* * * * *